United States Patent
Culp

(10) Patent No.: US 7,093,803 B2
(45) Date of Patent: Aug. 22, 2006

(54) APPARATUS AND METHOD FOR AERODYNAMIC WING

(76) Inventor: David A. Culp, 2004 Silver Lake Way, Martinez, CA (US) 94553

( * ) Notice: Subject to any disclaimer, the term of this patent is extended or adjusted under 35 U.S.C. 154(b) by 11 days.

(21) Appl. No.: 10/736,925

(22) Filed: Dec. 16, 2003

(65) Prior Publication Data

US 2005/0127240 A1   Jun. 16, 2005

(51) Int. Cl.
    *B64C 31/06* (2006.01)
(52) U.S. Cl. ............... 244/153 R; 244/155 A; 244/145; 244/152; 244/902
(58) Field of Classification Search .......... 244/33, 244/902, 900, 145, 146, 152, 142, 153 R, 244/155 R, 154, 155 A; 114/39.12, 39.11, 114/39.21, 39.29, 102.11
    See application file for complete search history.

(56) References Cited

U.S. PATENT DOCUMENTS

| | | | |
|---|---|---|---|
| 2,546,078 A | 3/1951 | Rogallo et al. | |
| 2,737,360 A | 3/1956 | Allison | |
| 2,751,172 A | 6/1956 | Rogallo et al. | |
| 3,285,546 A | 11/1966 | Jalbert | |
| 3,298,635 A | 1/1967 | Barish | |
| 3,356,059 A | 12/1967 | Ross | |
| 3,558,087 A | 1/1971 | Barish | |
| 3,720,180 A | 3/1973 | Strangeland | |
| 4,129,272 A | 12/1978 | Jones et al. | |
| 4,296,704 A * | 10/1981 | Bridge | 114/102.23 |
| 4,363,458 A | 12/1982 | Jones et al. | |
| 4,497,272 A | 2/1985 | Veazey | |
| 4,708,078 A | 11/1987 | Legaignoux | |
| 4,722,497 A | 2/1988 | Stanford | |
| 5,033,698 A | 7/1991 | Schimmelpfennig | |
| 5,355,817 A | 10/1994 | Schrems | |
| 5,366,182 A | 11/1994 | Roeseler et al. | |
| 5,642,683 A | 7/1997 | Bedford | |
| 2003/0132348 A1 | 7/2003 | Lynn | |
| 2003/0140835 A1 | 7/2003 | Wrage | |

OTHER PUBLICATIONS http://en.wikipedia.org/wiki/America's_Cup.*
Kiteship 1, http://web.archive.org/web/20031101021201/www.kiteship.com/id9.html.*
Kite Sails For America's Cup.*
American teams to battle it out, http://archives.cnn.com/2002//WORLD/sailing/12/19/lvcup.repechage/.*
http://www.kiteship.com/id1.html.*
http://www.kiteship.com/id14.html.*
Kiteship2, http://web.archive.org/web/20031101150906/http://www.kiteship.com/id4.html.*
http://www.sailinganarchy.com/innerview/2003/daveculp.htm.*
IACC rule vers 4.
ISAF Equipment Rules of Sailing.

* cited by examiner

*Primary Examiner*—Timothy D. Collins
(74) *Attorney, Agent, or Firm*—Charles L. Thoeming

(57) ABSTRACT

Aerodynamic wing to propel a broad range of transport means, principally sail craft. The wing provides a single layer kite structure capable of flying without surface discontinuity, bridles, or rigid or semi-rigid structure. All stresses within the wing are converted into pure tension and transferred through the wing surface outward to attachment lines. The wing shape defines a large diameter self-supporting rolled over leading edge of an airfoil and the wing profile approaching the trailing edge exhibits increasing convexity. The wing is useful to propel, or supplement propulsion to, transportation means.

25 Claims, 7 Drawing Sheets

APPARATUS AND METHOD FOR AERODYNAMIC WING

CROSS-REFERENCES TO RELATED APPLICATIONS

None.

STATEMENT REGARDING FEDERALLY SPONSORED RESEARCH OR DEVELOPMENT

None.

REFERENCE TO A MICRO-FICHE APPENDIX

None.

BACKGROUND OF THE INVENTION

1. Field of the Invention

The present invention relates to aerodynamic devices or wings typically used to propel boats, vehicles or persons across water, land or ice or snow, to propel airborne craft above ground or in space, or to propel nano-technological devices. More specifically this invention relates to an improved aerodynamic device and method of using the same designed to replace specialized downwind and cross wind sails on sailing boats sometimes referred to as spinnakers. The improved aerodynamic device and method of the present invention is applicable to mono-hulled, and multi-hulled boats in a variety of tonnages.

2. Description of the Related Art

A search of the prior art located the following United States patents which are believed to be representative of the present state of the prior art: U.S. Patent Publication No. US 2003/0140835A1, published Jul. 31, 2003, U.S. Pat. No. 5,355,817, issued Oct. 18, 1994, U.S. Pat. No. 5,642,683, issued Jul. 1, 1997, U.S. Pat. No. 4,497,272, issued Feb. 5, 1985, U.S. Pat. No. 5,033,698, issued Jul. 23, 1991, U.S. Pat. No. 4,708,078, issued Nov. 24, 1987, U.S. Pat. No. 4,296,704, issued Oct. 27, 1981, U.S. Pat. No. 4,129,272, issued Dec. 12, 1978, U.S. Pat. No. 3,720,180, issued Mar. 13, 1973, and U.S. Pat. No. 3,356,059, issued Dec. 5, 1967.

While the following discussion focuses on recreational sailcraft applications, the example is not intended to be limiting. The device of this invention may be used in other flying situations and also with other types of vessels, vehicles and marine structures.

While using kites, parachutes and other kite-like devices to draw sailing vehicles is not a new enterprise, to date most existing sailcraft utilize a fundamentally imbalanced force couple when connecting their wind-effected elements to their water-effected elements. This imbalance causes a lateral overturning moment, which most sailing craft counter either by the addition of ballast below the vessel's center of buoyancy, or by offsetting significant structure athwartships, or both. Either solution offsets the boat's center of gravity and center of buoyancy as the boat heels, offering a countering, or righting, moment. In addition to cost, weight and drag increases associated with either solution, a stability limit is eventually reached whereby no more sail area, or no greater wind speed may be utilized. A kite's entire force may be attached to the boat at the deck, or even near or below the waterline, reducing the overturning moment arm to near zero, ameliorating much or all of the overturning torque at its source, thus obviating the need for traditional solutions.

A corollary to the above relates to longitudinal overturning moment. A typical sailcraft develops a significant longitudinal or pitching moment as well, again due to the sails' resultant force being vertically offset from the hull's drag forces. This is particularly evident in powerful and fast racing craft, and is typically countered by increasing the buoyancy of the craft's hull(s) forward, shifting weight aft, or by de-powering the sailing rig at top speed, in order to remain within the vehicle's performance envelope. Bringing a kite's attachment point down to the deck or below reduces or eliminates this pitching moment, allowing the vessel to safely be sailed harder at higher speeds. It also allows the designer to contemplate hull shapes, equipment layouts and weight trimming schemes which do not need to counter this said pitching or overturning moments, but can maximize the vessel's speed, ride and/or cost savings instead. Such a vessel can carry ordinary sized kites in appreciably higher winds, or appreciably larger kites in ordinary winds. Alternatively, such a vessel can be designed with far less inherent stability, or utilizing significantly decreased weight, cost, and/or complexity. Such considerations may allow new classes of sailing boats to sail significantly faster, safer and/or more comfortably than existing sailing vessels.

The use of kites also allows sailing rigs to be placed on non-sailing craft or other mobile marine or vehicular structures without regard for whether or not such boat or structure has sufficient transverse stability to carry a conventional sailing rig. For example, commercial vessels, cargo ships, oil drilling rigs and barges of all types may be self-powered with kites, without significant alteration to their structure.

If fitted in lieu of the sailboat's mast and all rigging, a kite can reduce a vessel's all-up weight significantly; also her all-up windage, cost and structural complexity. Since ordinary sailing vessels rely on highly tensioned shrouds and stays, taken to the vessel's extremities, and commensurately highly compressed mast and mast mounting structures, with all forces dissipated throughout the vessel's structure, such structure must be engineered to withstand such forces, in addition to forces associated with payload, sea state and prudent safety margins. When replaced by a kite, there are only pure traction forces which can be concentrated at a single attachment point or small attachment area in the central part of the vessel, and all non-traction rigging forces can be eliminated completely, leaving the designer or structural engineer with much smaller, centralized forces to dissipate through the structure. This may lead to lighter, stronger, faster and less expensive racing boats, and also to simpler, lighter, less expensive retrofitting of kites to existing sailing and non-sailing boats, ships and marine structures.

Flying a boat's wind-effected structure(s) at altitudes higher than a boat's typical mast and sail can yield more wind energy than current practice harvests. Friction and turbulence with the water's surface slows surface winds appreciably for some distance above the water's surface. Meteorological studies estimate approximately as much as 20–30 percent higher velocity to wind at 100–150 feet above the surface than at 10–20 feet, for a range of typical wind velocities and sea states. Energy in the wind varies with the square of the wind's velocity, a 30 percent increase in velocity yields a potential 69 percent increase in available energy, if the vessel's sails can be deployed in such higher velocity stream. Simply flying an identically-sized kite at higher altitude than a competing racing yacht's sail, for instance, can yield a race-winning advantage through the greater energy available.

Since a free flying kite is functionally decoupled from the boat it is pulling, it is free to accelerate and/or to fly at speeds different from those the hull experiences. For instance, if a kite begins high in the sky, and is then dived towards the water at the same time the hull begins to accelerate, the kite will reach a high percentage of the wind's speed (often greater than unity) far sooner than will the hull. The apparent wind experienced by the kite will be much greater than that experienced by the boat. If sailed alongside an identical boat with identically-sized sails, such a maneuver will yield faster acceleration of the kite-driven hull than of the conventionally driven one.

Similarly, if the kite is flown in a constant zig-zag or sine wave pattern, it may fly at all times faster than the hull and will experience continually higher apparent wind than either its own hull or the hull and sails of similar competitors nearby. It will thus harvest and deliver commensurately more power to its attached hull, yielding higher speed than its competitors. At the same time, since the hull does not travel at the kite's speed, the entire vessel does not suffer appreciably increased drag penalties due to increased aerodynamic drag on the hull, crew and associated appendages.

Conversely, using such maneuvering of the kite, or "dynamic sheeting" to increase power, a kite powered vessel may develop similar power and boat speeds as other similarly sized vessels while using significantly smaller kites than the other boats' sails. This might yield significant cost savings, weight savings, or allow the effected boat to use smaller sail handling equipment, fewer crew, smaller control energy inputs, etc. Such downsizing can result in a "beneficial spiral," whereby utilizing smaller lighter equipment and crews allows smaller, lighter hulls to be used, resulting in the need for even smaller, lighter kites, lighter control equipment and crew, etc.

Flying the kite decoupled from the boat, at altitudes substantially above the water's surface can generate lower transient or shock stresses on the kite structure. Motions of the boat, and especially of its masthead and other extremities when sailing in rough water largely aren't transferred to the kite structure. Perturbations of the wind's flow caused by friction and interference with surface discontinuities (water waves) which adversely effect normal sails largely do not effect kites. As a result of these factors, airflow across the kite is smoother and aerodynamic effects are largely not interrupted. In addition, since the kite structure does not experience large and sudden accelerations due to such motions, either at its attachment points or throughout its structure, building of materials which are light weight, of high modulus and/or very limited in stretch characteristics may be contemplated. These materials are contra-indicated in ordinary spinnakers whose shock loads often exceed the mechanical properties even of superior materials.

It should be noted that the simultaneous use of all of the above: non-heeling, lighter or non-existent masts and sail handling equipment, higher winds aloft and dynamic maneuvering of the kite can create a synergistic effect, pushing the "beneficial spiral" ever farther.

Prior art in the field teaches kites and kite-like devices which have limitations for use aboard sailing vessels. Some are difficult to deploy or fly in close proximity to boat hulls. Others are difficult or dangerous to assemble, launch or recover in high winds. Others have low wind thresholds, or stall speeds, which are too high to make them useful in light winds. Still others are expensive to produce or difficult or expensive to maintain and repair. Others require specialized equipment to launch, control or recover. Still others have features or physical characteristics which render them not rule-legal for yacht racing under widely accepted yacht racing rules and definitions (e.g., the International Sailing Federation, "ISAF").

Launch and recovery techniques and equipment have been investigated by others. Various levels of complication, reliability and expense have been proposed, from pre-launched leader or pilot kites to air cannons to hydraulically extendable masts to the use of lighter than air gas-filled balloons, aerostats and other shapes as kite launch assistors. A system which is simple, reliable and fits within sailors' existing skill-sets has eluded invention to date.

Kite designs may be broadly characterized according to their construction. The range of constructions covers a broad spectrum from framed, semi-framed or unframed single skin kites to double skinned, air filled or "ram air" type kites, to hybrid combinations of these various types. Regardless of their construction type, all kites must have some means of maintaining their chord wise and span wise shape while flying.

Several ways of forming or contributing to the form of the profile and chord wise and span wise shape of a wing while it is flying are known and practiced in the art.

One approach is the use of kites which have little or no aerodynamic refinement. Profiles which resemble hemispherical parachute canopies have been proposed, including various methods to control both position and power of such kites. See, for example, Bedford (U.S. Pat. No. 5,642,683) or Stanford (U.S. Pat. No. 4,722,497) and also toy-like devices consisting of flat rectangular pieces of cloth with lines attached to the 4 corners.

Other apparatus and methods use rigid or semi-rigid frame assemblies. See for example Roeseler (U.S. Pat. No. 5,366,182).

Another approach is to build non framed, air filled wing shaped structures and to contrive for air pressurization by being open near a flow stagnation point to bleed into internal spaces within the wing, which pressurized air then functions as a structural element. This is often referred to as the ram air system after Jalbert (see for example U.S. Pat. No. 3,285,546).

Yet another approach is to arrange some elements of the wing's aerodynamic surfaces to be otherwise than perpendicular to the general axis of the flying lines and set so as to generate aerodynamic forces that cause the wing tips to pull away from each other. See, for example, Lynn (U.S. Patent Publication No. 2003/0132348).

In another approach, multiple bridle lines may be attached to the wing at intervals span wise and chord wise and these bridle lines converge to the flying lines at a point or points between the operator and the wing. Such bridles, by distributing the tension in the flying lines more evenly over the surface of the wing, reduce the bending load on span wise structural elements and therefore assisting in the retention of span wise form. See, for example, Schimmelpfennig (U.S. Pat. No. 5,033,698)

In the case of kites with rigid or semi-rigid frames, multiple bridles or else triangular or quadrilateral shaped pieces of material attached at one edge and standing out from the kite's surface called keels or flares make it possible for these frame elements to be proportionally smaller and lighter, however both the weight of the frame and the air drag of multiple bridle lines or keels are detrimental to cost, aerodynamic efficiency and manufacturing simplicity.

Limitations of Current Art

In the case of simple soft flat or hemispherical-shaped kites the major drawback for sailing use revolves around two issues; multiple bridle lines and aerodynamic efficiency. Many-bridled kites are difficult to launch from the crowded and complex confines of typical boat decks. Kites with low aerodynamic efficiencies (Lift/Drag ("L/D")≦1) can only be used for a narrow range of sailing courses, perhaps 20–40 degrees either side of dead downwind. Playsail-type kites (for example, see: http://www.nyke.org/Play Sail Workshop.htm) need a large separation of their flying anchors and suffer leading edge collapse upon acceleration, thus are not presently used in sailing applications.

In the case of conventional Jalbert, parafoil or parapent style foil kites that use ram air inflation as their structural element, the pressure differential available is so small as to allow no possibility of sufficient span wise beam strength without support from multiple bridles spaced at intervals both chord wise and span wise. Because more bridles allow thinner and more aerodynamically efficient airfoil sections to be used and also permit higher aspect ratio form thereby reducing induced drag there has been a tendency in recent years for parafoil style traction kites to have upwards of 60 bridle lines.

In the case where aerodynamic forces are used to retain or assist in the retention of span wise form, multiple bridles typically reduce the proportion of the kite's aerodynamic surfaces that are required to be other than approximately perpendicular to the flying lines and hence increase the proportion of surface area that can be applied directly to supplying pull on the flying lines. An advantageous consequence of this can be a higher lift coefficient, which manifests as more pull in proportion to overall size. Bridle lines do however, in themselves, add undesirable drag and often tangle during launching from deck or during flying in such a way as to prevent satisfactory operation of the kite.

Traction kites using various combinations of these contributions to chord wise and to span wise shape are known and used. Each have inherent advantages and disadvantages pertaining to cost, tangle resistance, luff resistance, specific power, upwind ability, packing ease, relaunch ease (especially from water), gust responsiveness and other values.

Examples of rigid or semi rigid framed kites include Allison (U.S. Pat. No.2,737,360) and Roeseler (U.S. Pat. No. 5,366,182). These kite types rely largely on the cantilever strength of their struts or frames for their aerodynamic shape. These kites are typically heavier than non-framed kites and are not amenable to scaling to large sizes, due to physical scaling factors increasing their specific weight (weight per unit area) unfavorably.

An example of a traction kite using mainly a combination of multiple. bridle lines and aerodynamic forces to hold span wise form is described in WO99/59866. This kite has a very flexible spar or bundle of spars comprising the leading edge of the kite and multiple panels, separated from each other by sets of bridles arranged in the flow wise direction and with these panels arranged and shaped so that the aerodynamic pressure distribution around them provides the major contribution to the span wise form for the kite. This kite is still heavier than frameless kites and, as it partially relies on its rigid framework, still suffers from scaling factors at large sizes. In addition, both these and framed kites are typically characterized by sharp leading edges, which limit the kite's ability to respond efficiently to varying or extreme angles of attack.

An example of a traction kite using a combination of only aerodynamic forces and multiple bridles to hold its span wise and chord wise form and with no rigid, semi-rigid or ram air structural elements is what has become known as the NASA parawing or NPW (e.g., http://www.npw5.com/). A bridle line is a line which does not run uninterrupted from the kite wing surface to the ultimate end of attachment, but rather joins together with other such lines, typically in a grouped or cascaded manner. These grouped bridle lines typically move as a group when their controlling attached "flying line" is manipulated by the kite forces or the handler. The NASA para-wing traction kite has a single skin, shaped and supported by bridles in such a way as to generate aerodynamic forces that are sufficient to form the span wise and chord wise shape of the kite. NASA wings are themselves ramifications of earlier wings after Rogallo (See U.S. Pat. Nos. 2,546,078 and 2,751,172). This type of kite is light in weight as it is both frameless and is built of a single layer of structural material, but it suffers drag penalties associated with its multiple bridle lines (typically 30–50 lines) and its generally non-smooth surface shape. In addition, multiple-bridled kites suffer from tangling issues during launch and recovery operations. Also, as many of the bridle lines are taken to the kite's interior surface, strong tearing and peeling loads are created throughout the structure, which make local reinforcing necessary and scaling problematic.

Also see an improved form of NASA wing known as ESB (http://home.swipnet.se/telsplace/ESP12/ESPMod2.Html) and also (http://home.swipnet.se/telsplace/Tug ESP3/ESPMod3.html which has a more aerodynamically efficient shape and reduced number of bridle lines, but remains in a state of development pending improvements in stability, controllability and launch from boat decks.

An example of a traction kite using ram air inflation as its span wise structural element in combination with multiple bridle lines is described in Schimmelpfennig (U.S. Pat. No. 5,033,698). This kite is a double skin ram air inflated envelope with airfoil profile ribs, without any frame but with multiple bridles distributed chord wise and span wise over the surface of the kite, and primarily near to the kite's leading edge, to assist retention of chord wise and span wise form. It uses aerodynamic forces to reduce the number of chord wise bridle lines, but it does not use significant contribution from aerodynamic forces to maintain its span wise shape. These kites are typically heavier and more expensive than single-skinned frameless kites, yet lighter than rigid or semi-rigid framed kites. They suffer from minimal available inflation pressure, necessitating either thicker than optimal airfoil profiles, the need for multiple bridle lines with their attendant tangling and drag problems, or both.

An example of a traction kite using ram air inflation in combination with a span wise semi-rigid structural element and some contribution to span wise form from aerodynamic forces but without multiple bridling is described in Jones, et. al. (U.S. Pat. No. 4,363,458). This kite is a double skin ram air inflated airfoil with a semi-rigid spar spanning its leading edge. Only two flying lines are used, one attached to each wing tip at the leading edge. The trailing edge of the kite is unsupported by bridles or flying lines. This kite solves the multiple bridle issue, but substitutes unwanted added weight of a substantial cantilevered solid spar at its leading edge, and also suffers from scaling issues.

An example of a traction kite using a semi-rigid frame in combination with a single or double skin and some use of aerodynamic forces but without multiple bridles or at least with very few bridles is described for instance in Legaignoux (U.S. Pat. No. 4,708,078). This kite has an armature of inflated tubes covered by one or two flexible skins. The tubes can be inflated through one or more sealable orifices using a pump for example to pressures significantly greater than would be available by ram air inflation. These tubes form a semi-rigid spar along the leading edge of the kite and usually also a series of chord wise orientated spines extending from the leading edge to the trailing edge at intervals across the span of the kite. Heavier than other single skin kites and heavier than even most double skin frameless kites, this kite may be categorized as a semi-rigid frameworked kite as it relies ultimately on the cantilever strength of its inflated tubes for its ability to maintain its aerodynamic shape in sizes larger than those used for small sailboards and the like. The tubes must be of sufficiently large diameter and remain sufficiently inflated to maintain the shape required for the kite to fly satisfactorily. This kite thus suffers similar scaling issues to framed kites previously cited.

Examples of kites which use primarily aerodynamic forces to maintain their shape, with or without substantial ram air inflation are for example those of Barish (U.S. Pat. Nos. 3,298,635 and 3,558,087) and Lynn (U.S. Patent Publication No. 2003/0132348). These kites either have substantially a single layer skin (Barish) or minimal bridle lines (Lynn), but each suffers from one or more of the drawbacks of other kites cited above, i.e., high weight, peel or tearing forces, manufacturing complexity, line tangling or scaling limitations.

No existing kite or kite type in any combination of the above attributes or any others, prior to the preferred embodiment of this invention, are currently capable of being ruled as legal spinnaker sails for sailcraft racing, for instance under existing International Sailing Federation (ISAF) 2002 Yacht Racing rules. Such yacht racing rules specifically prohibit double skins or interior structure, inflated components, ram air, framing or supporting materials of any kind, prohibit openings into or holes through any part of the structure or flares or other surface discontinuities and prohibit more than three total flying lines, each lead directly to the corners of a substantially triangular piece of foldable, flexible material.

It is therefore an object of this invention to develop a class of kite-like structures capable of flying freely while towing a vehicle, supporting itself in stable, controllable tethered flight at L/D ratios in excess of two. The structure and the vehicle it powers therefore benefit from all the attributes of sailing kites as cited earlier.

It is a further object of this invention to achieve the above in a class of structure which have only a single layer of foldable, flexible, lightweight material, for instance nylon spinnaker cloth, without pressure inflated, ram air inflated or rigid or semi rigid struts or appendages of any kind.

It is yet a further object of the present invention to achieve the above without the use of multiple bridle lines, but to do so with as few as two, three or four total flying lines, each taken directly to the kite structure.

It is yet another objective of the present invention to achieve the above by creating a class of shapes in which all aerodynamic and tether line forces devolve into the kite's structure substantially as tension-only forces, thus largely eliminating compressive, cantilever, tear or peel forces from the (typically) fabric structure, allowing scaling of the device to relatively very large sizes without undue deleterious scale effects. The class of structure should use only aerodynamic forces to maintain its flying shape.

Yet another object of the present invention is to create a class of kite-like devices which may be easily and familiarly launched, flown and recovered from small and large vessels while afloat without assistance and with or without specialized sail-handling equipment, by sailors with typical expertise and strength.

Still another object of the present invention is to achieve all of the above while resulting in a class of devices which are efficient to manufacture, easy to maintain and to repair, inexpensive to transport and that "look and feel" similar to existing spinnaker sails so as to be readily acceptable by amateur and professional sailors of average ability.

It is a further object of the present invention to create a class of flying structures which hew specifically to the legal definition for "spinnakers" as defined in the International Sailing Federation (ISAF) 2002 yacht racing rules and/or other similar yacht racing rules.

It is still further an object of the present invention to provide for the simple addition of lighter than air (LTA) gasses to the class of structure, with minimal alteration or aerodynamic effect, in order to effectuate extremely light wind performance, launch and retrieval.

BRIEF SUMMARY OF THE INVENTION

The preferred embodiment of the present invention consists of a three dimensional, two lobed hemispherical kite-like structure constructed of a plurality of pieces of foldable flexible sheet material, e.g.; nylon sailcloth, cut and edgewardly attached to form a single layer of shaped material. The three dimensional shape of the structure in the preferred embodiment of the present invention is entirely determined by the varying curve of the edges of each piece of material. Other embodiments of the present invention may be constructed of shaped, molded or heat-formed sheet materials, whether of a single homogeneous material, textile cloth or multi-layered built-up composite flexible material.

The kite of the preferred embodiment of the present invention consists of a cloth surface which is non discontinuous and consists of a leading edge, two trailing edges, two wing tip corners and a tail corner. All three edges have a hem-like structure with a lightweight line encased which can be variably tightened or loosened, similar to standard sailmaking practice. All three corners are reinforced in a manner commensurate with typical spinnaker sailmaking practice in order for the corner fittings to transmit all the force created by the structure into the three flying lines without material failure. The kite surface consists of multiple flat gores of cloth, each cut in such a way that, when fastened edge to edge, a developed, shaped surface is produced. This same shape could be produced by other molding processes whereby a three dimensional shape is produced via molding or assembly of the one piece sail onto a three dimensional mold or mandrel.

The preferred embodiment of the present invention has three reinforced corners to which three flying lines are attached plus optionally one or more interior reinforced points to which are attached one or more launch/retrieval lines. It is to be understood that other embodiments of the present invention might be built with one, two, three or more lobes and be controlled by two, three, four, or more flying lines without altering the spirit of the present invention.

The apparatus of the present invention may be added to an existing vessel irrespective of whether it has a mast and sails installed. If present, the kite may be flown outside all existing rigging, or from said rigging, or in lieu of such rigging, which may then be safely removed, alleviating weight, cost and complexity associated with it. If retrofitted to existing vessels or vehicles, such a kite may profitably augment or replace existing sails, as for instance to replace a racing or cruising spinnaker with a larger kite or a same-sized kite capable of operating in significantly higher wind speeds than the replaced sail. Minimal or no alterations to the boat's existing rig need take place and the kite may or may not use the yacht's existing sail handling gear, and some or no other sail handling equipment as desired.

The kite of the present invention flies freely without rigid support of any kind other than pure tension in the flying lines and in flight inflation due to air flowing past the kite, and it may be efficiently controlled in three axes by crewmen aboard a boat or other surface vehicle via altering the relative length of the lines. In flight the shape of the kite portion of the present invention is supported solely by aerodynamic forces, said shape being designed to optimally support the structure to interact with a maximum wind cross section, to create an airfoil profile which is optimized for extracting maximum energy from moving wind, to fly in a stable and controllable manner, and to facilitate effective control by the crewmen.

The preferred embodiment of the present invention is preferably launched much like a conventional spinnaker. A launch/retrieval line is taken from a reinforced point near the center of the leading edge of the kite to the boat's hounds or masthead. Having made ready all flying lines by attaching them to their respective corners of the kite while still in its bag, hauling on the boat's halyard then extracts the kite from its bag and presents it to the wind. Operator(s) or line tender(s) then tension the flying lines, the kite fills and flies up and away from support. The line tenders then controllably extend their respective lines in order to both control the kite and to increase its distance away from the boat. The kite may be successfully flown at a wide range of varying distances from the boat. The launch/retrieval line is kept slack at all times while the kite is flying and does not effect the kite in any way. Recovery is nearly the reverse of launch, the retrieval line is made taut, deforming the kite and diminishing its aerodynamic capabilities. The kite is then drawn back to the boat via the retrieval line, typically while it remains flying above the water's surface. Typically, all parts of the launch/retrieval sequence are reversible; i.e., at any time during either sequence, said sequence may be reversed and the kite either retrieved early before completely launched or re-launched upon partial retrieval. This operational method of the present invention differs from typical spinnaker launch/retrieval sequences which are typically "all or nothing." It is a fault of spinnakers that the result of launch/retrieval operations are sometimes "nothing."

Alternatively, on boats without masts or sailing rigs, the kite may be launched from a variety of temporary or permanent poles or mast-like structures; such device only needs sufficient strength to support the kite's own mass. Flexible poles such as large fishing poles are sufficient.

Alternatively the kite may be launched "from hand" at the deck or ground level without mast or other support. In this case it is typically launched by one or two crewmen who spread the kite on the deck or ground, then present the kite's leading edge to the wind. As the kite fills with air, the line tenders tension the flying lines to retain control as the kite flies up and away. As above, the line tenders then controllably extend the flying lines both to control the kite and to increase the distance between the kite and boat.

The preferred embodiment of the invention has another emergency method for eliminating all power and retrieving the kite. If all flying lines and launch/retrieval lines are suddenly made slack, with the exception of the tail line(s), the kite will immediately fold upon itself and will lose all power from the wind. In such case it presents a minimal area to either wind or water and is relatively very easy to retrieve via the tail line(s). This method is suitable for recovery of the kite in very high winds, or when it has entered the water, or when there is a gear failure or other emergency aboard the boat. So long as the lines can be made slack, through lengthening, releasing or even cutting them away, the kite may be rendered powerless and conveniently retrieved.

DESCRIPTION OF THE INVENTION

Figure 1:
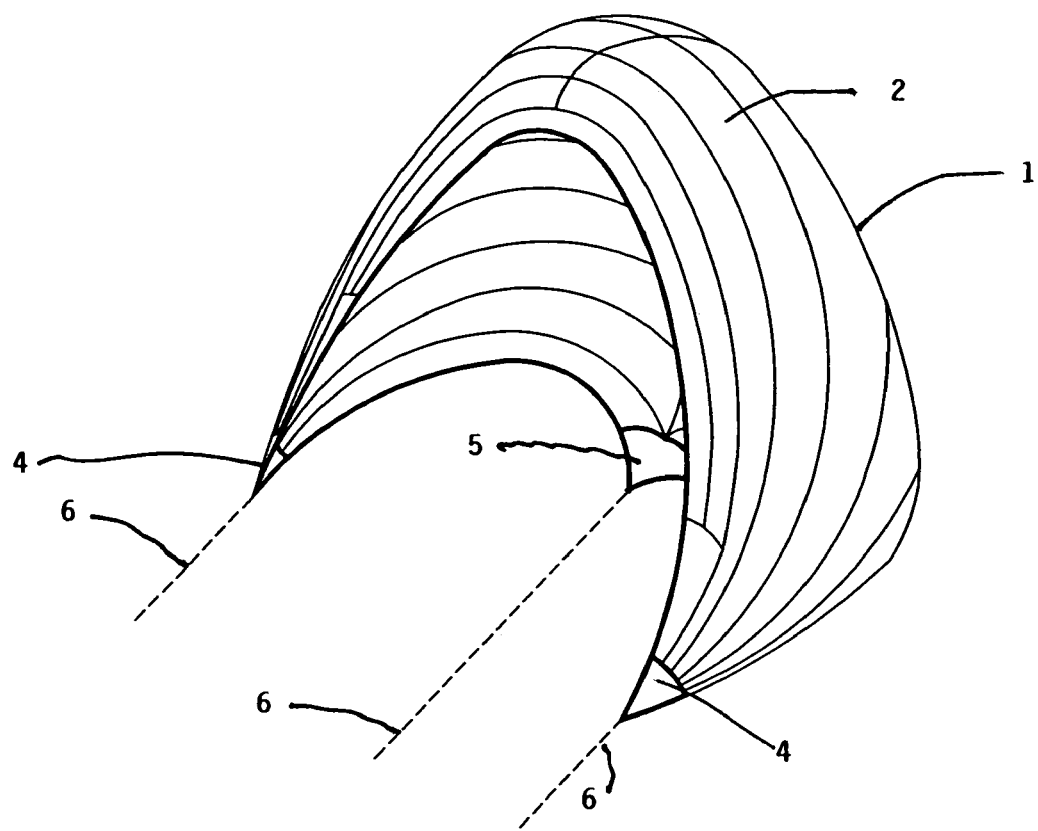
FIG. 1 is a orthogonal perspective view of the preferred embodiment of the present invention in flight.
Figure 2:
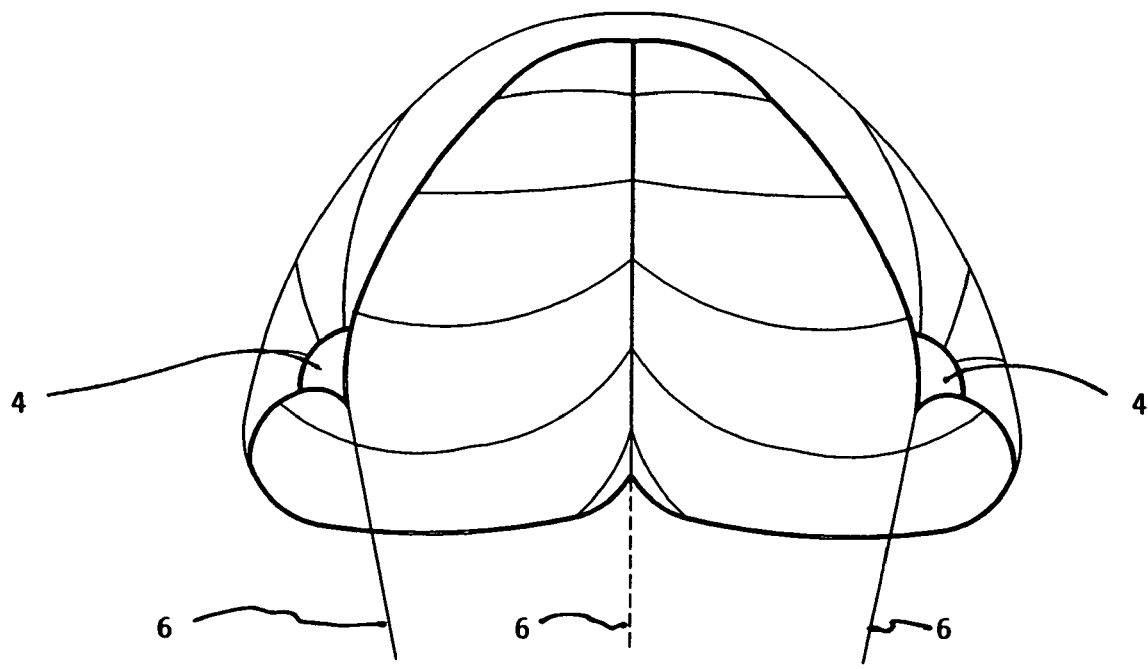
FIG. 2 is a front view of the preferred embodiment of the present invention in flight.
Figure 3:
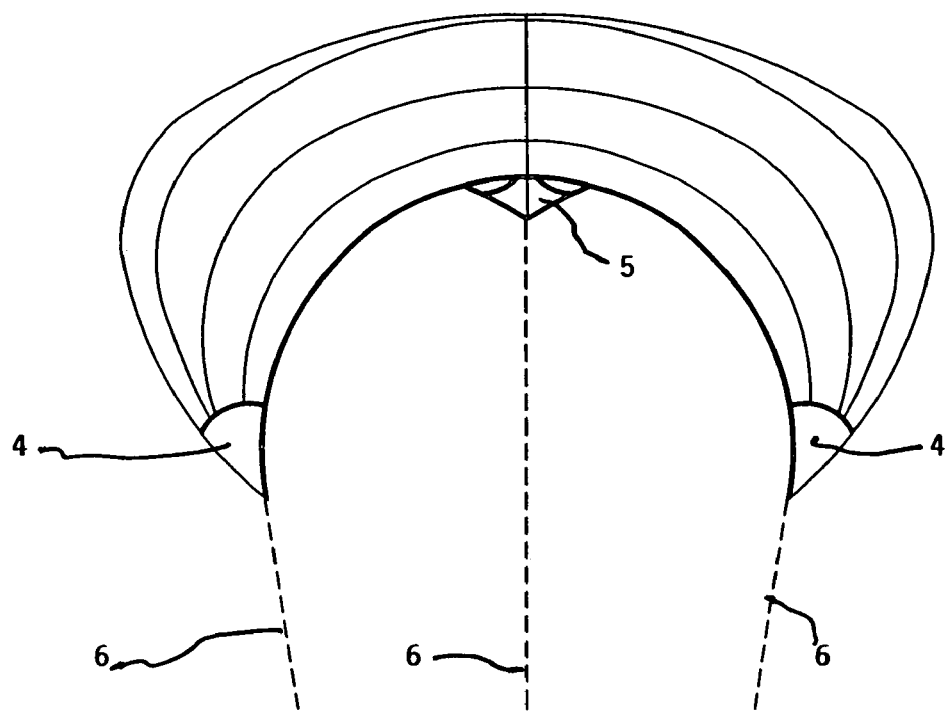
FIG. 3 is a top view of the preferred embodiment of the present invention in flight.

The preferred embodiment of the present invention differs from any existing or past sail or kite in a number of respects. First it contains a unique combination of several attributes:

a) It is comprised of a three-dimensional shape (FIGS. 1–6) that is inherently stable and powerful in flight, and capable of positive control via altering flying line lengths 6. This shape is capable of supporting factors b), c), and d) below.

b) It is made of a single flexible skin 1 of uniform or variable density and contains no surface discontinuities, "keels," "flares" or similar. It is relatively lighter and stronger than similar kites with flares, as these typically impose tearing or peeling stresses on kite structures for which the structures must be designed. It contains no enclosed cells, double surfaces or interior structure of any kind. As such it is simple and inexpensive to manufacture, to maintain and to repair. It is relatively lighter in weight than other kites.

c) It is capable of being built with no rigid or semi-rigid structure or framework of any kind either internal or external. It contains no spars or battens, either of rigid or semi-rigid material or enclosed inflated spaces. It employs no ram air or other inflatable or rigid or semi-rigid members of any sort. The kite need not rely on specialized internal structure, differentiated or aligned fibers or embedded rope, tape or other contrivance for strength, shape or aerodynamic ability, although these can be added if desired. This means it is relatively lighter in weight, simpler and cheaper to manufacture than other similar structures. All rigidity in the preferred embodiment is a result of air flow and pressure capture as a result of the kite's shape and the manner it is presented to the flow of air.

d) It has no, or a sharply reduced number of bridle lines compared to other non-sparred kites. As depicted in FIG. 2, the preferred embodiment of the present invention has no bridle lines, and only 3 flying lines 6, each of which terminates one end at a unique point on the periphery of the kite's structure (i.e. 4 or 5) and the other end at the vessel's sail handling equipment FIGS. 7–8. Along with the above attributes, this means it is relatively easy to handle and prepare for launch aboard ship, it is very easy to recover, prepare and re-launch, it is less expensive in both materials and labor to produce, maintain and repair.

The kite of the present invention remains a relatively efficient aerodynamic device, creating L/D ratios in excess of two, even with the above attributes. At the same time it is a true kite, capable of flying stably while attached solely by flexible lines or strings 6 and without close attachment to any rigid structure on the boat or ground, FIGS. 7–8. Some other sails and/or kites have utilized one or more of the above attributes, but no previous sail or kite has included all of them.

The preferred embodiment of the invention can be built so that it qualifies as a legal racing spinnaker, without alteration or exception under existing inshore and offshore yacht racing rules. The invention will be relatively inexpensive to manufacture even at large sizes, be relatively easy and convenient to launch, fly and recover. It may be used to replace racing spinnakers on most racing yachts and also serve as a cruising, or casual spinnaker on yachts whose owners do not wish to fit currently expensive and difficult to control conventional spinnakers.

Figure 7:
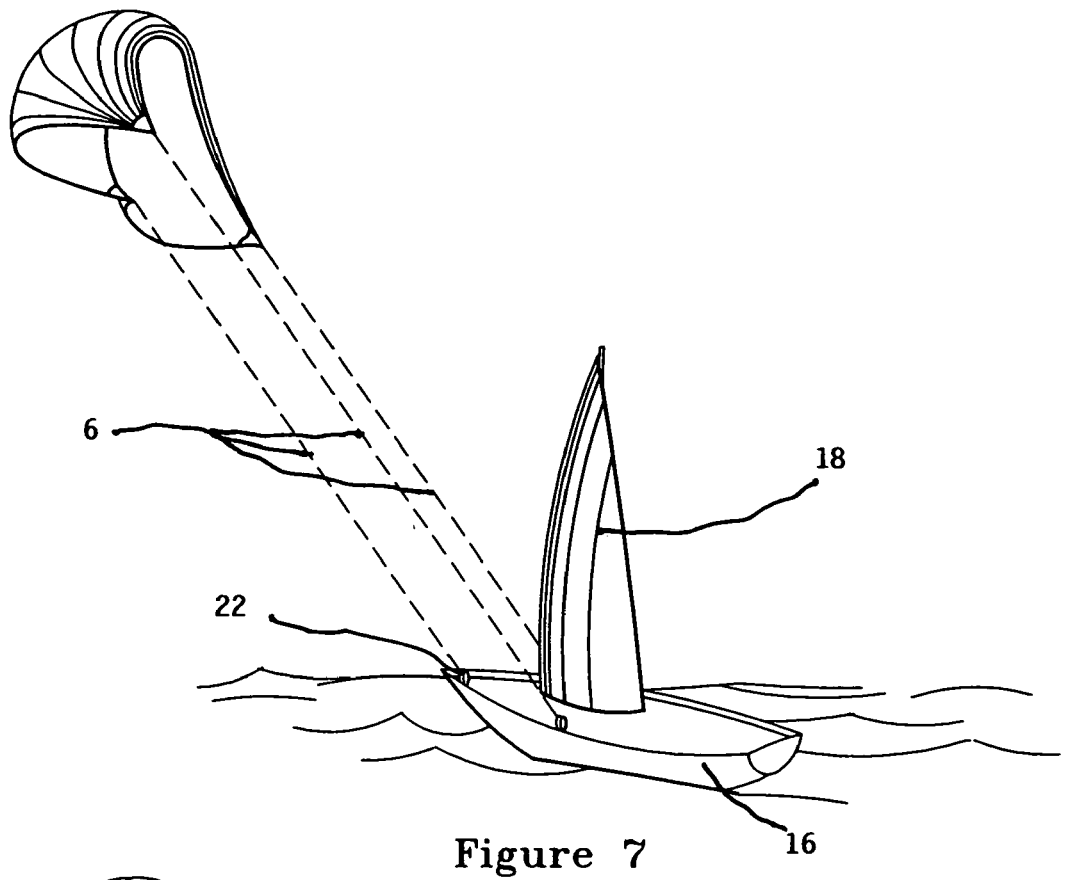
FIG. 7 is an orthogonal perspective of the preferred embodiment of the present invention pulling a boat which is also rigged with a conventional mast and sails.
Figure 8:
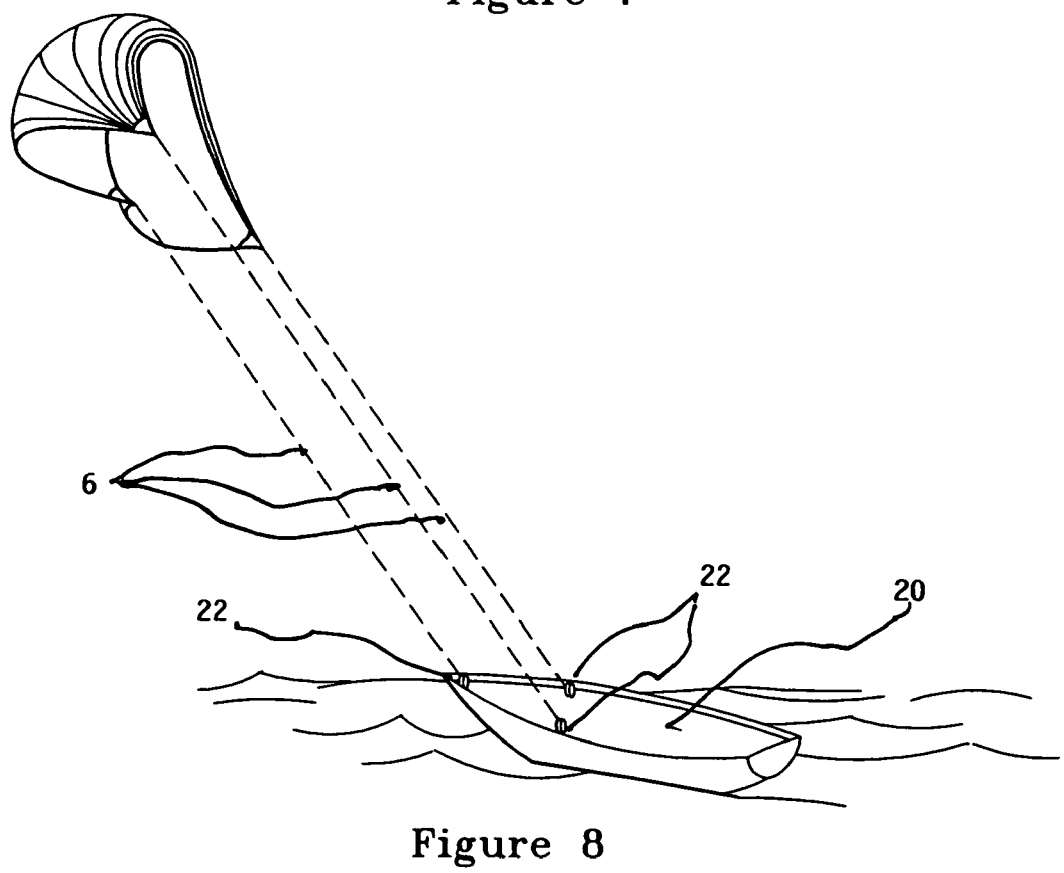
FIG. 8 is an orthogonal perspective of the preferred embodiment of the present invention pulling a boat which has no mast or other sails.

The preferred embodiment of the present invention can be flown from typical sailing yachts, FIG. 7, without the need for spinnaker poles, reaching struts, spinnaker pole tracks, lazy sheets, lazy guys and most other specialized spinnaker handling equipment. In this way it is significantly less complex and less expensive for such use than conventional spinnakers.

The preferred embodiment of the present invention can be flown stability when all flying lines 6 are lead to a single point on the hull's structure. It can also fly effectively when the lines are lead to separate and disparate points 22 on the hull's structure, FIGS. 7–8.

This invention can be launched from a wide variety of vessels and marine structures; for instance, the kite can be launched, flown and recovered by any racing sailboat without the removal or alteration of any of her standard sail handling equipment, and without addition of any new or specialized equipment. While the kite can be launched and controlled by a multiplicity of generally available captive and non-captive winches and winch systems, a preferred embodiment of the invention, even at very large sizes (in excess of 100 square meters, and up to 1000 square meters) can be launched, flown and recovered using only the winches, cleats and line handling equipment found on typical sailboats, and also without winches of any kind at all, using only skillful manipulation of the length of the kite's flying lines.

The present invention can be launched, flown and recovered aboard normal sailing vessels 16, FIG. 7, while simultaneously deploying normal mainsails, jibs and other sails, 18. The present invention can also be launched, flown and recovered from non-sailing vessels 20, FIG. 8, and other marine structures which do not have masts, booms or any other spars, appendages, winches or other sail handling equipment installed. The kite apparatus of the present invention can be added to non-sailing marine structures (such as commercial powered vessels, barges, oil rigs, etc.) with minimal retrofitting of equipment or appendages.

The kite apparatus of the present invention can be scaled to very large and very small sizes. Very large sizes, on the order of 100,000–10,000,000 square meters, could be built for instance of very thin and lightweight flexible material, such as plastic or metallic film, and could be packaged aboard spacecraft. These very large wings could be deployed and used as lightweight, inexpensive, frame-less, bridle-less solar sails aboard interplanetary or interstellar vehicles. Very small sizes, with surface areas on the order of $\frac{1}{100,000}$ square meter to a nano-meter, could be constructed of various flexible or non-flexible plastic or metallic materials. Such very small wings could be applied to nano-technologies using sailing, gliding and/or soaring physics amongst and within fluids and fluidic interfaces including, but not limited to, air, water, blood, plasma, and the like.

Shape and Function of the Kite

The aerodynamic means or wing of the kite apparatus of the present invention flies and embodies the attributes delineated above due primarily to its physical shape and manufacturing techniques. The kite shape differs from previous state of the art in the following manner and for the following reasons.

General Shape of the Canopy.

As more completely depicted in FIGS. 1–6, the shape of the kite is largely determined by the interaction of the wind and the kite's skin 1. The skin 1 is developed into a three-dimensional shape through skillful and specific shaping of the gores or fabric panels 2 from which it is built. By joining differently curved fabric gores 2 edge-to-edge, a three-dimension shape 1 can be formed. This method is typical of shaped fabric structures, such as sails, parachutes and fabric balloons. Unlike other similar structures, all of the shape of the invention is developed from these fabric gores, or more generally, from the 3-dimensional shape of the canopy created by assembly of the gores 2. There are no internal or external supporting structures, bridle or riser lines or artificially contained inflation to assist in shape creation and retention. The kite is shaped in a form which converts all stresses, including but not limited to aerodynamic forces, gravity, transient forces due to the structure's inertia and the inertia of the air which is impinging on it, largely into simple tensile stress within the fabric at all locations in the structure and especially near the wingtips 4 and tail corner 5, and into pure tension in the attachment lines 6 which are attached thereto. The kite's entire ability to open and remain open to the force of the wind, retain its lightweight structure and to convert its aerodynamic forces into tension in the flying lines relies on the shape of the kite's gross structure. This structural shape is notable in several ways:

Shape of the Profile.

Figure 9:
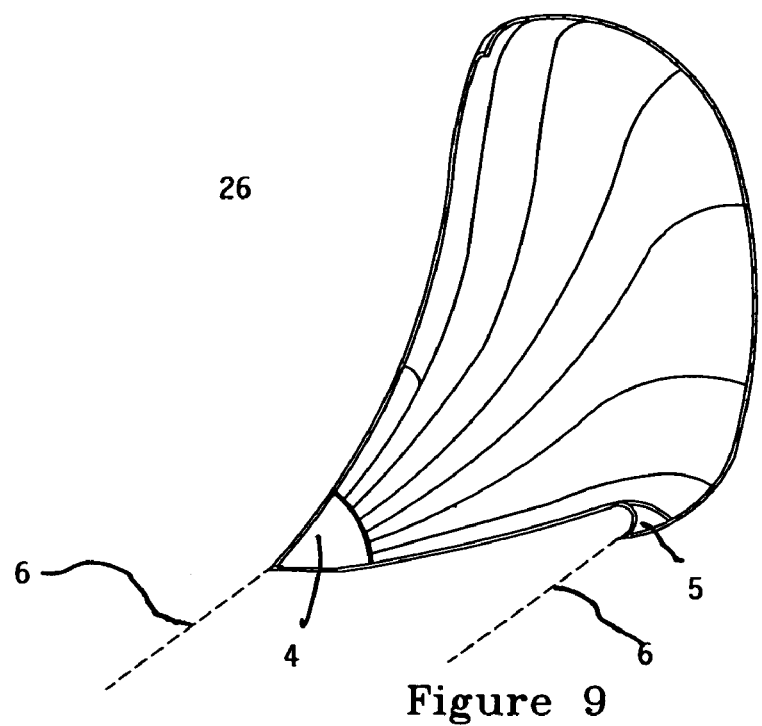
FIG. 9 is a vertical cross-sectional view of inside of the preferred embodiment of the present invention in flight of FIG. 5, along the centerline axis 15.

As depicted in FIG. 9, the profile, or vertical cross section of the kite 26 is an airfoil shape, designed to cause the airflow past and around it to yield a maximum exchange of momentum to the kite structure, while minimizing the disturbance of that smooth airflow. This profile 26 is similar to other airfoil shapes used in sailing and flying structures.

This shape is determined entirely during construction by varying the shape of the fabric gores from which the kite is built, FIGS. 12–15, or by three-dimensionally shaping the kite's surface by other methods such as molding, heat forming and the like, by the pressure of the wind impinging on the surface, and to a lesser degree by skillful manipulation of the flying line lengths during flight. The three-dimensional shape of the fabric kite is designed to be optimally affected by such manipulation.

Leading edge.

Figure 6:
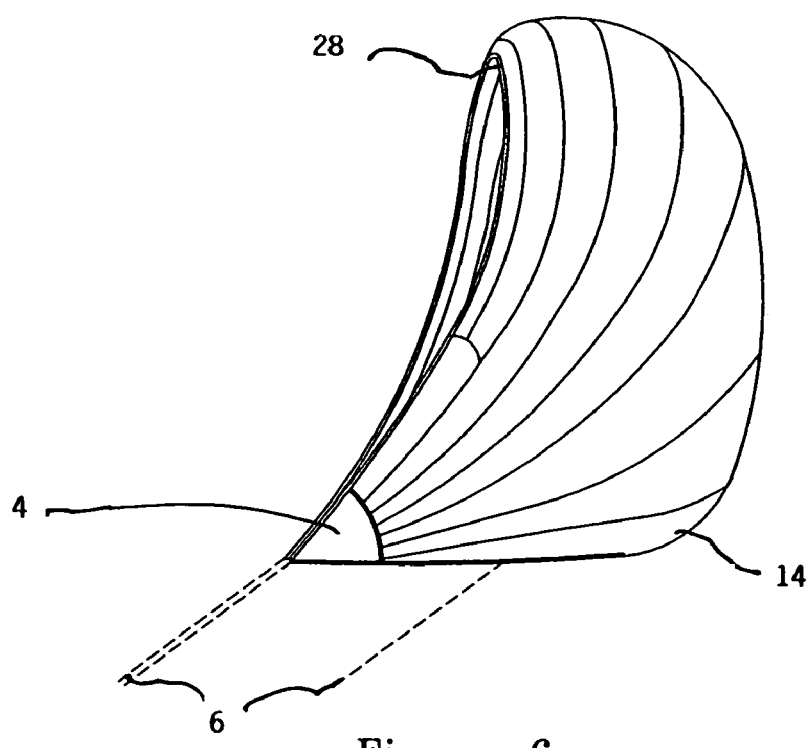
FIG. 6 is a side view of the preferred embodiment of the present invention in flight.

As seen in FIG. 6, the leading/upper edge of the kite is formed into a self-supporting rolled-over shape 28. This rolled-over shape 28 comprises, in flight, the leading edge of the kite's airfoil. Utilizing a large diameter leading edge renders the kite relatively insensitive to changes in angle of attack of the localized air flow. This is important when the kite accelerates or decelerates and the local angle of attack varies widely and quickly. If the leading edge were sharp, as with a raw or hemmed cloth edge, the kite would be highly sensitive to variations in angle of attack, and would be prone to partial or complete collapse and to widely varying coefficients of lift during flight.

It is commonly understood that at the leading edge of any airfoil, the "stagnation point", or the point at which flow separates and either flows above or below the airfoil, is the highest positive pressure anywhere throughout the device's structure. In inflated flying structures, support to resist this pressure is typically generated via rigid structural members, separately inflated chambers or coinciding the inflation point of ram air chambers with the stagnation point of the airfoil profile, providing sufficient internal pressure at the nose.

The present invention provides a different method of creating a fundamentally higher pressure within the kite's internal structure, in order to support this rolled leading edge without the usual support methods which are unavailable. The manner in which this is effected is a major contributor to the present invention's success. Since the kite presents the same edge to the wind on either tack, the shape of the leading edge can be sophisticated, highly shaped and markedly different from that of the trailing edge, unlike more conventional spinnakers.

Internal Inflation Pressure and Internal Air Flow.

Although this kite has only one layer of cloth or film and no internal chambers, nevertheless it has a marked differential in pressure between its inside, or windward, and outside, or leeward, surfaces.

It is largely by skillful manipulation of this pressure differential and of the airflow which results from this differential that allows the kite to be shaped and fly efficiently, increase and reduce its resultant force at the operator's command, and to be turned and otherwise controlled by the operator. It is also by manipulation of this pressure differential, both via the fundamental shape of the kite and by skillful manipulation of the length of its flying lines, that sufficient internal pressure can be generated in order to overcome the aerodynamic stagnation point pressure and support the kite's leading edge.

Profile Shape and Manipulation of that Shape Near the Tail.

The profile shape, or vertical cross section of the aerodynamic means or wing near the trailing edge exhibits increasing convexity as it approaches the trailing edge 14, FIG. 6. This differs from typical airfoil sections which exhibit decreasing convexity as they near their trailing edges. This shape in the preferred embodiment is created by the shape of the fabric gores 2 which make up the kite near the trailing edge, FIGS. 12–15. The shape can also be formed via other methods such as molding, heat forming, etc., as before. The amount and location of the maximum convexity is also manipulable by the relative tensions of the flying lines 6, FIGS. 1–8. This convexity and its control are necessary to control the amount and location of air pressure differential, thus shape and air flow at varying points throughout the kite's structure. It is this convexity and control of same which creates the internal, or windward side, pressure sufficient to maintain the leading edge, and also the differential pressures and flows within and without the kite which render it controllable.

Effect of Differential Line Length on Shape, Air Flow and Steering

The present invention may be controlled in three axes, resulting in stable flight without requiring the kite to be rigidly attached to a mast or other structure. Roll and pitch are adjusted by skillful manipulation of the length of the three flying lines 6. Unlike a rigid or semi rigid structure, altering the flying line 6 lengths does not directly alter the kite's attitude, but rather subtly distorts its shape in such a way that such attitudes are affected.

When the relative lengths of the two wingtip lines is altered with relation to each other, several things happen. The kite's gross shape becomes somewhat asymmetric, which alters the air flow within and across it in an asymmetric fashion. In addition, the curvature of the trailing edge is altered in such a manner as to cause an asymmetric variation of internal air volume and pressure, which further alters the flow of air across the kite's internal and external surfaces. Skillful manipulation of the third, tail line length can exacerbate this effect, by effectively isolating the trailing edge alteration largely to only one half of the trailing edge, thus increasing the asymmetry of air pressure and flow. The effect of this asymmetric flow is to cause the kite to rotate in yaw, which effectively alters the direction in which it moves. In addition, isolated alteration of the length of the tail line, or a skillful combination of alteration of the tail line length with the relative lengths of the wingtip lines will affect the kite's overall angle of attack and the internal pressure and air flow within the kite, or cause the earlier described asymmetric flow coincident with said alteration in angle of attack and internal air pressure. It is possible to decrease the kite's angle of attack and internal pressure to a point where there is insufficient pressure to maintain the leading edge's inflation, whereupon this may be induced to collapse, profoundly affecting the kite's gross shape, its profile shape and its aerodynamic response. Conversely, it is possible to increase the kite's angle of attack up to and well beyond its aerodynamic stall point, to the extreme that it is possible to stop and even reverse the airflow across the kite structure, causing it to stop in mid-air and even to reverse direction. It is thus possible, via relatively small differences in line length, to reduce lift to relatively very low levels and also to increase lift to relatively very high levels, all the while maintaining positive control of the kite's attitude, altitude and flying speed.

Aspect Ratio.

The ratio of projected vertical height to projected horizontal width of the kite is chosen as a compromise between efficient use of cloth, maximization of projected area and aerodynamic efficiency. The aspect ratio can be varied through a wide range without fundamentally altering the kite's abilities or function. The preferred embodiment is only representative; both higher and lower aspect ratios are contemplated, each will have specific advantages and disadvantages.

Construction Details.

This description will assume construction using ordinary sheet manufactured woven cloth. It should be noted that this device could also be built of non-woven material, also of laminated, multi-part materials and also of monolithic, cast-in-place material. The gross shape of the finished device will not be altered by choice of material or construction method, even if the minute shape and finish of the device may be. In most embodiments, the finished material will be flexible and cloth-like in its feel and utility, although it can also be rigid, as of sheet metal. The entire body of the kite is grossly homogeneous without areas of high localized stiffness, padding or significantly increased thickness. All portions of the device can be "folded" as defined in ISAF rules and regs without permanent distortion or damage.

The kite of the preferred embodiment, when constructed, consists of a single piece of seamed cloth-like material with two and only two non-discontinuous sides. In flight it takes a shape 1 as displayed in drawings 1–6. This shape 1 is defined by the shaping of the constituent materials, and by tensions created within the kite's structure by pressure of moving air currents (wind), concentrating in the kite's three corners where the flying lines 6 attach. The shape 1 given to the finished kite is made possible by, for instance, breaking the surface into a multiplicity of fabric gores or pieces 2, FIGS. 1, 12–15. The specific shape 1 of these pieces, FIGS. 12–15, when attached together and placed under the requisite wind and line tension, will result in the shape 1 specified.

The shape 1 of the kite is effectuated in the preferred embodiment via alteration of the shape of the flat fabric gores 2 from which it is constructed. The shape of these gores 2, and thus the resultant shape 1 of the kite, is effectively altered during flight by air pressure and by the resultant stretch, if any, in the cloth or film from which the kite is constructed. It is an attribute of the kite that it is shaped, when unstretched, specifically so that its shape when stretched in flight will closely approach the specified design shape. The amount and location of stretch within the kite's structure can be altered and controlled in various ways. Cutting the fabric gores 2 to shapes which will stretch into desired shapes is one way, FIGS. 12–15. Another method is via introducing seams, reinforcement fibers or variable thickness and/or variable strength cloth into different gores 2 or portions of gores 2 which will purposely align or purposely misalign with load paths within the kite's structure. By manipulation of these reinforcements, material grains and material types, the kite's strength and stretch may be controlled, and also the kite's resultant shape, weight and durability. It should be noted that identical or near-identical final shaped may be constructed from widely varying fabric panel layouts, as depicted in FIGS. 12–15.

The cloth, film or other sheet material gores 2 are attached to each other, edge-to-edge, to construct the kite, FIGS. 12–15. Sewing, gluing, fusing, welding or other joining methods, or combinations of different methods can be used, depending upon the material and the desired end characteristics of the structure. The structure may also be molded of a single continuous sheet of material, for instance, by assembling a multi-ply structure onto a mold or curved form. Similarly, a single ply, heat malleable or shrinkable sheet material may be applied to such a mold or curved form, then be heated and cooled or otherwise mechanically or chemically manipulated to conform to its final desired shape. In such embodiments, a three dimensional structure without seams will ensue. Additional layers, tows or fibers of reinforcing materials different from the exterior film or cloth may be included into such a seamless lay-up in order to design in specific strength, stretch or wear characteristics.

Alternatively, the structure may be made of "composite" molded construction. This method of construction comprises laying a thin film of thermoplastic or other film material onto a mold, then laying thin strands or "tows", "straps" or "bands" of uni-directional, high-modulus fiber across the structure, typically in line with expected or designed load paths. A resin-type material is added as binder, with a further thermoplastic film or other film material layer on top. These layers are then baked or heat treated, sometimes under pressure, to make a monolithic structure conforming to the shape of the mold.

In the preferred embodiment of the present invention, the jointures between edge-to-edge gores 2 are first adhesively secured using double-sided sail-maker's adhesive tape, then sewn, using flat overlapping seams and a zigzag sewing stitch. This technique follows methods for constructing spinnakers. In the preferred embodiment of the present invention, kites from about one square meter to about forty square meters utilize an overlapping flat seam approximately 12 mm. wide, and a single row of 8–10 mm. wide zigzag stitching. In kite sizes from approximately 40 square meters to approximately 400 square meters, the overlapping flat seam varies from approximately nineteen to twenty-five mm. wide, and two rows of eight mm. zigzag stitching are used. In the larger sizes of the kite of the preferred embodiment of the present invention, a wider stitch may be substituted, or a wider "triple stitch" zigzag stitch may be substituted.

After assembly, the kite structure is reinforced at its edges, at its corners, and sometimes along its interior seams. In the preferred embodiment of the present invention, the kite corners are first reinforced as a benefit of the multiple gore seams converging at the corners. In the preferred embodiment of the present invention, this multiple seam convergence occurs only at the highly loaded wingtips, but not at the lighter loaded tail. With alternate embodiment gore panel layouts, kites may be designed wherein the seams converge at all corners. In addition, multiple additional layers of fabric can be added to all corners, first glued on and then sewn through the underlying kite structure.

Figure 16:
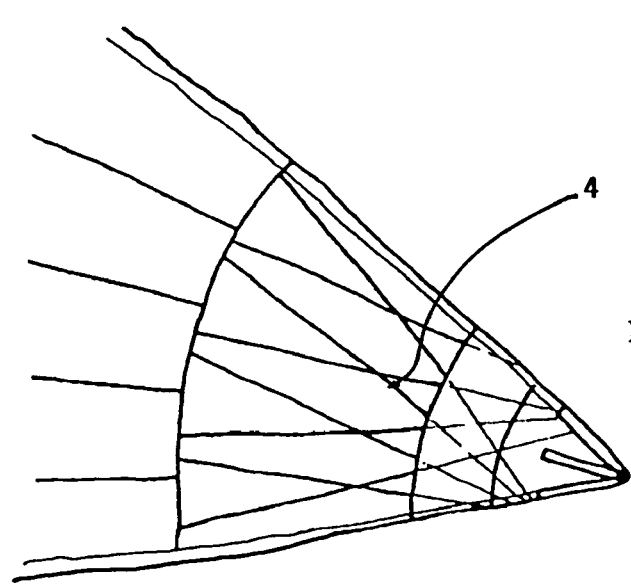
FIG. 16 is a representative method of reinforcing corners of the preferred embodiment of the present invention.

Typically, this consists of two different applications. First a matrix of overlapping pieces of cloth are applied in a fashion that leads to a progressively increasing average number of layers of cloth, as the reinforcing approaches the corner of the attachment point. In the preferred embodiment of the present invention, these pieces of cloth are rectangular and identical in size, consisting of approximately six rectangles at the narrower wing tips and approximately eight rectangles at the wider tail. For a seventy square meter kite of the preferred embodiment of the present invention, with an overall laid-flat width of approximately eighteen meters, this reinforcement might extend approximately one to one and one-half meters from the corners. Thus, reinforcing rectangles might be approximately twenty to thirty cm. by one hundred to one hundred-fifty cm. FIG. 16 indicates how these pieces are overlapped to result in a progressively increasing number of layers as the corner is approached. The majority of the outermost rectangles, and some portion of every rectangle, is trimmed away after sewing the rectangles down to the kite structure. The final result is trimmed to the same shape 1 as the underlying kite structure.

The second reinforcing application consists of the application of multiple arcs of circular pieces of cloth with decreasing radiuses. Typically these can be either of the same material and weight as the main kite structure, or progressively heavier or stronger cloth or other sheet material can be used, depending on the final strength needs of the finished kite. Finally, webbing straps of suitably sized nylon, polyester, aramid or other polymer are sewn on both sides and through the entire structure at the corners, to yield attachment points for the flying lines 6, FIG. 16. These corners may or may not terminate with stronger metal rings for attachment of the lines.

An alternative method of reinforcement comprises each underlying fabric gore to overlap its adjacent gore in a controlled and tapering manner. In this fashion, as the fabric approaches the wing corner, there are relatively more and wider fabric overlaps, resulting in more overlapping layers of cloth. The total thread count or total width times thickness of all material layers determines the relative reinforcing strength as desired by the application.

The edges of the preferred embodiment of the present invention are reinforced by adding a strip of the same material as the underlying kite structure, aligned, glued, then sewn flat on one side of the parent cloth. For a seventy square meter kite, this strip may be approximately thirty mm. wide. For a three hundred square meter kite, it may be approximately sixty mm. wide. Finally, a folded over piece of cloth "ribbon" or edge tape is attached, overlaying the parent cloth and reinforcing material. This tape might be nineteen to forty mm. wide after folding. Inside the hem which consists of the folded tape sewn down to the kite edge, a small diameter length of rope or line is inserted. This line is preferably of a light, strong low stretch material. In the preferred embodiment of the present invention, spectra is used to minimize both weight and stretch. These lines are inserted into all three edges of the kite, and are continuous pieces, leading from corner to corner of the kite. The lines lead from inside the edge hem of the kite through holes in the hem, to point outside, near the kite corners. Tabs, miniature cleats or other fastening means are provided, so that the tension of these "leech lines" may be adjusted, either ashore or afloat. Increasing or decreasing leech line tension alters the shape and fluttering of both the kite's leading and trailing edges.

These various reinforcing pieces may be made of the same material as the wing's main panels or gores. They may also be made of thinner or lighter, or of thicker or heavier, versions of the same material, or of significantly different material than the main panels in order to vary the relative strength, stretch, and/or weight properties as desired.

Reinforcing patches are sewn onto the kite in various places, either along the edges or within the kite body, as necessary for attachment of launching or retrieval lines, temporary or permanent furling assemblies, or other kite attachments. Examples of reinforcing structures are presented in FIG. 12–16. These embodiments of the present invention may be controlled by sailing class racing rules and are optional, depending on the final use of the kite.

In the preferred embodiment of the present invention the wingtips are arranged in such a way that approximately 70–80 percent of the kite's total pull is applied to them, leaving the remaining 20–30 percent of pull on the tail 5. In other embodiments of this invention, the wingtips may be repositioned forwards or rearwards in three-dimensions in such a way as to alter this balance between respective line tensions. This repositioning is effectuated, for instance, by reshaping the gores from which the kite is built, or via other methods resulting in an altered three dimensional shape. The proportion of tension carried by the tail line can thus be varied during construction from about 50 percent of the total to effectively 0 percent, with no load on it at all. In this case, 100 percent of the kite's pull devolves to the wingtips, and the tail line can be unloaded or eliminated. In yet another embodiment the wingtips can be sufficiently repositioned as to require a nose line, and to require no tail line at all. Further repositioning can vary the amount of total pull which this nose line carries. By varying characteristics of shaping the kite in each of these embodiments, control, power and efficiency thus will be realized.

Figure 11:
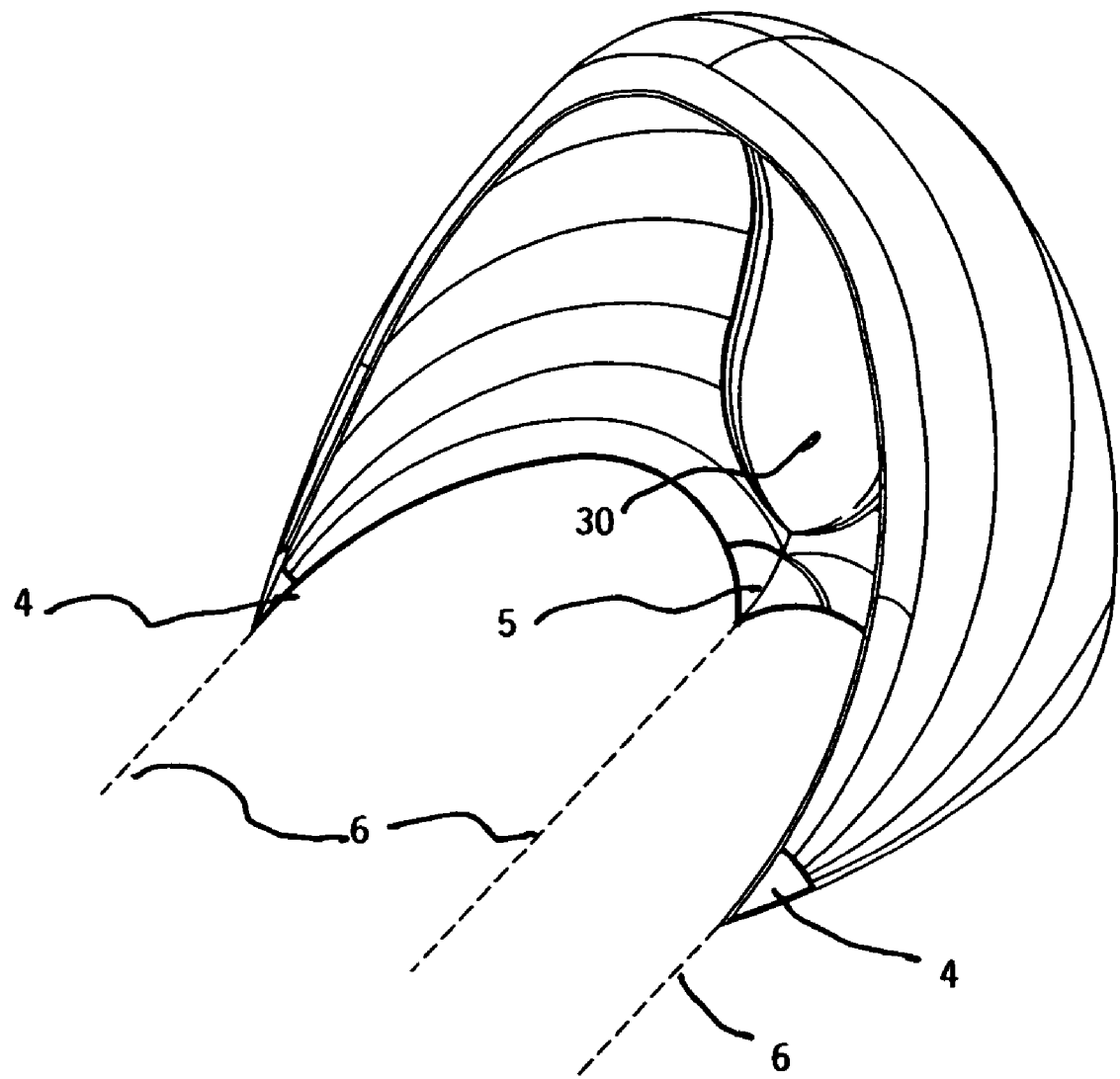
FIG. 11 is front view of an embodiment of the present invention employing a torpedo shaped structure built of a lightweight, gas impermeable material attached along the kite's centerline.
Figure 12:
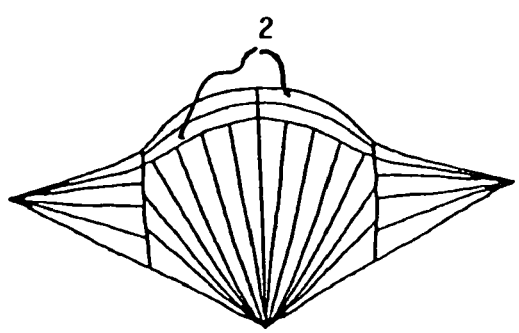
FIGS. 12–15 are alternate cloth panel layouts for the preferred embodiment of the present invention.
Figure 13:
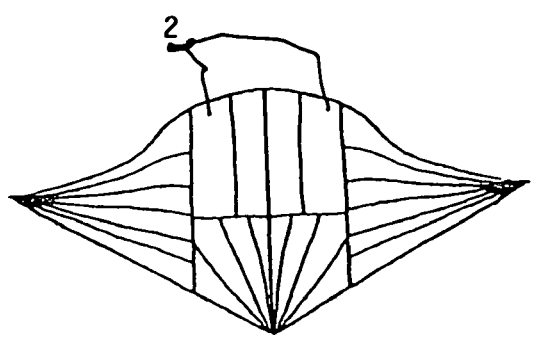
Figure 14:
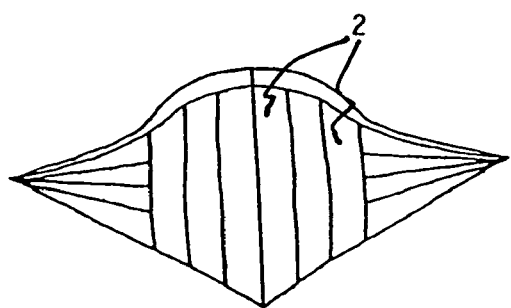
Figure 15:
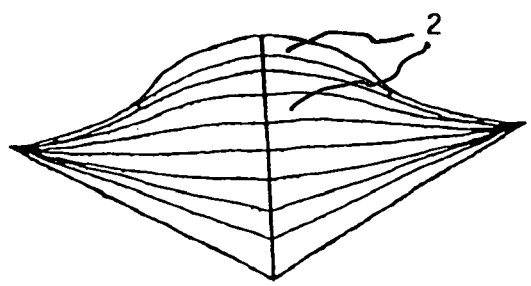

In another embodiment of the present invention, one or more variously shaped and sized enclosures is added to the kite's structure and filled with a gas which is lighter than air. As depicted in FIG. 11, the enclosure 30 is preferably a torpedo shaped structure built of a lightweight, gas impermeable material attached along the kite's centerline or near its nose on the inside surface to offer minimal drag and interference with the kite's aerodynamics. Due to the relatively light weight of the kite of the present invention, such enclosure can be relatively small yet carry sufficient gas to render the entire kite neutrally or negatively buoyant in air.

Using this alternate embodiment, launch, flight and recovery of the kite in situations where there is no or almost no wind at the surface may be effectuated, in order that the kite may find useful wind at altitude. Further, such embodiment will continue to fly during periods of very light or non-existent wind even at the kite's normal operating altitude.

Figure 4:
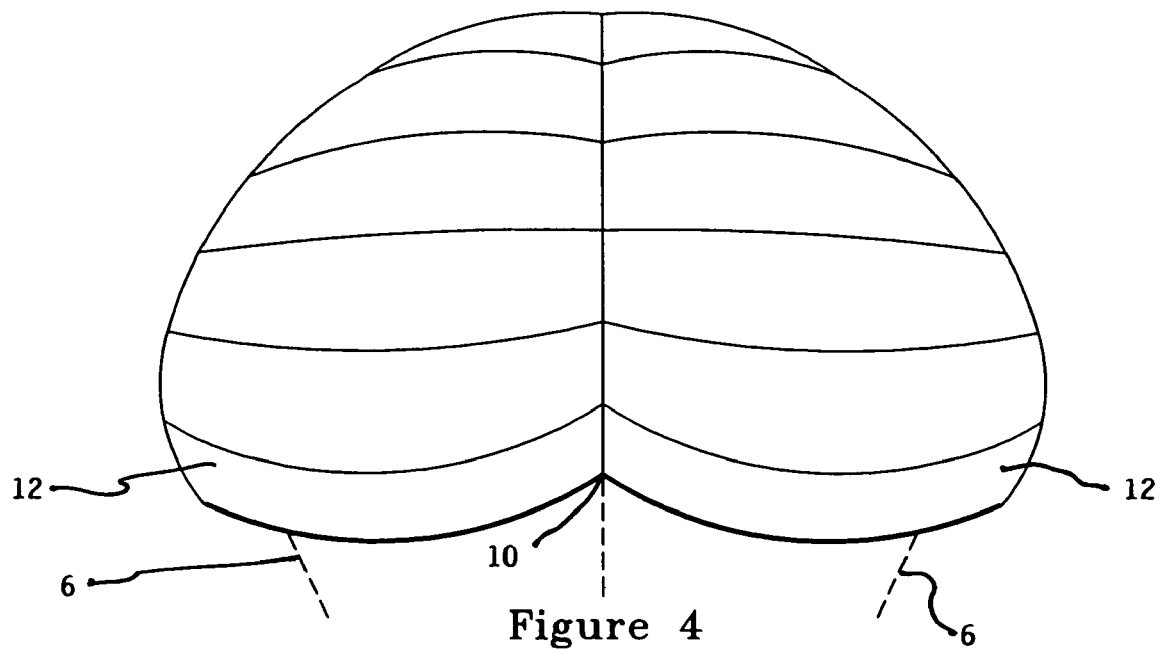
FIG. 4 is a rear view of the preferred embodiment of the present invention in flight.
Figure 5:
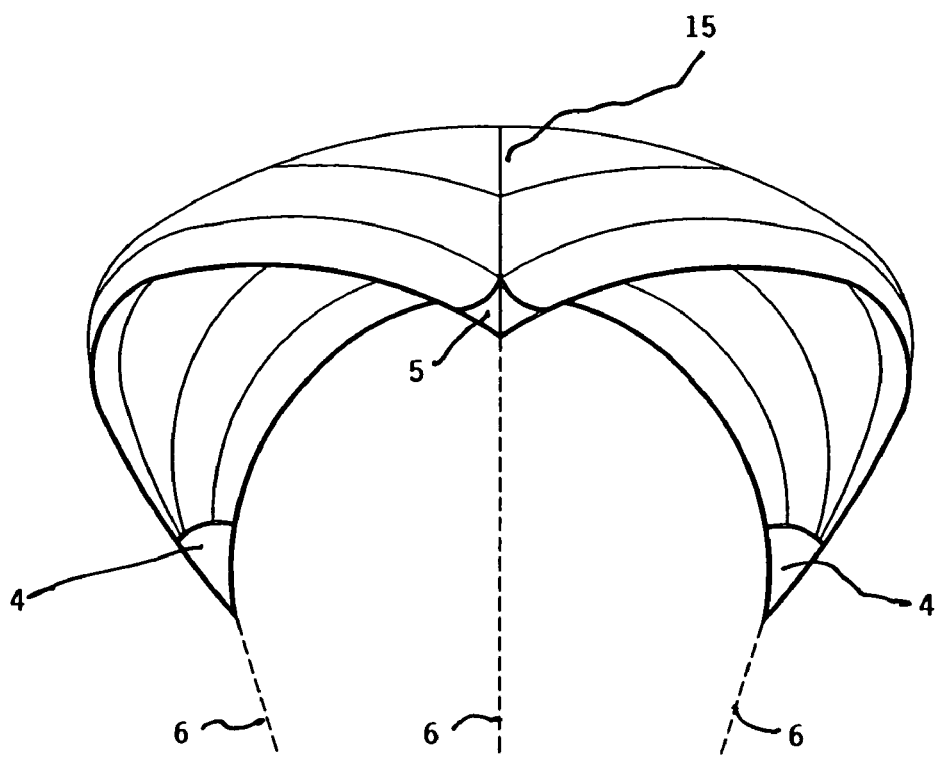
FIG. 5 is a bottom view of the preferred embodiment of the present invention in flight.
Figure 10:
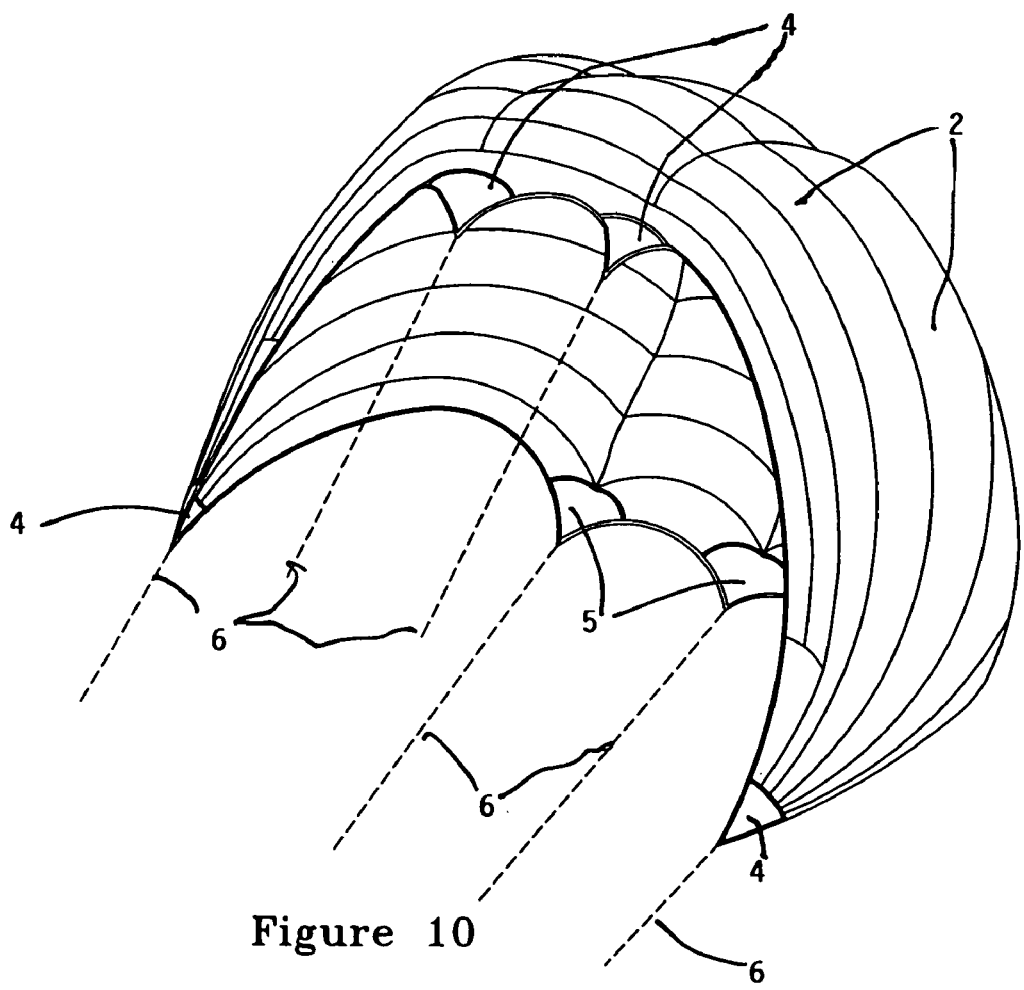
FIG. 10 is a front view of a multi-lobed embodiment of the present invention in flight.

The preferred embodiment of the present invention, as shown in FIG. 4, is constructed of two conjoined vaults or lobes of material 12, with a projecting angle, or groin 10 between the two, characteristically running partly or completely up and down the center line. In other embodiments of this kite, there may be one, two, or a multiplicity of lobes, with a characteristic groin between each, FIG. 10. In the preferred embodiment there are three flying lines 6 and no bridles or keels, FIGS. 1–8. In other embodiments there may be two, three, four, or more flying lines 6 taken from various places on the kite's extreme edges or corners, or from reinforced places within the kites structure itself, see, e.g., FIG. 10. These multiple lines may be cascaded, thus becoming bridle lines and flying lines, or they may all lead to the boat or ground. In the preferred embodiment there are no flying lines attached to the interior surface of the kite, and there are no discontinuities, flaps or flares of cloth attached to or projecting from the surface of the kite, used to attach additional flying lines, risers or bridles. In other embodiments there may be additional flying lines, risers or flaps or flares added, particularly at the groins or exterior angles between vaults or lobes of the kite. In the preferred embodiment of the present invention, the kite takes a grossly triangular structure when laid on a floor or other flat surface. In other embodiments the kite may also take a grossly rectangular shape, or a shape grossly relating to polygons of five or more corners.

Depictions and descriptions herein are meant to be representative and not limiting. It will be understood that variations of these are possible and sometimes preferred, and can be realized without altering the spirit of the present invention:

I claim:

1. Wind powered apparatus for transportation modes selected from the group consisting of watercraft, marine structures, skis, sail boards, land vehicles, dirigibles, aircraft, satellites, space craft, and nano-scale vehicles, the apparatus comprising:

a single layer aerodynamic wing capable of flying with variable wind direction and angle of attack, without surface discontinuity, without stabilizing lines, without bridles, and without rigid structure, and comprising a centerline, wingtips, and a tail corner; and further comprising a light weight, three dimensional wing consisting of a plurality of gores of predetermined geometries, defining a large diameter self-supporting rolled-over leading edge of an airfoil, a trailing edge, a nose, an inside windward surface, and an outside leeward surface, whereby all stresses within the wing resulting from aerodynamic forces, gravity, and transient forces due to inertia are converted into tensile stress within the wing and into pure tension transferred to the attachment means, and whereby the wing profile of the wing approaching the trailing edge exhibits increasing convexity; and attachment means linking at least one aerodynamic wing to a transportation mode whereby wing function and transportation mode motion are controlled.

2. The apparatus of claim 1, wherein the aerodynamic wing comprises a molded single continuous sheet of material, defining a large diameter self-supporting rolled-over leading edge of an airfoil, a trailing edge, a nose, wingtips, tail corner, an inside windward surface, and an outside leeward surface, whereby all stresses within the wing resulting from aerodynamic forces, gravity, and transient forces due to inertia are converted into tensile stress within the wing and into pure tension transferred to the attachment means, and whereby the wing profile of the wing approaching the trailing edge exhibits increasing convexity.

3. The apparatus of claim 1, wherein attachment means define axes in relation to the wing and transportation mode, and wherein roll and pitch, attitude, altitude, flying speed, angle of attack, internal pressure, and gross shape of the wing, and airflow within, are controlled by independent manipulation of attachment means length.

4. The apparatus of claim 3, wherein the wing further comprises of at least one variously shaped and sized enclosure containing a lighter than air gaseous mixture.

5. The apparatus of claim 4, wherein each enclosure is torpedo shaped consisting of a lightweight, gas impermeable material attached to the wing's centerline or near its nose on the wing's inside surface, and whereby the wing is rendered neutrally or negatively buoyant in air by at least one enclosure.

6. The apparatus of claim 5, wherein the wing consists of at least two conjoined vaults or lobes of material with a projecting angle, or groin, between the conjoined vaults or lobes characteristically running partly or completely along or parallel to the wing centerline.

7. The apparatus of claim 2, wherein attachment means define axes in relation to the wing and transportation mode, and wherein roll and pitch, attitude, altitude, flying speed, angle of attack, internal pressure, and gross shape of the wing, and airflow within, are controlled by independent manipulation of attachment means length.

8. The apparatus of claim 7, wherein the wing further consists of at least one variously shaped and sized enclosure containing a lighter than air gaseous mixture.

9. The apparatus of claim 8, wherein each enclosure is torpedo shaped consisting of a lightweight, gas impermeable material attached to the wing's centerline or near its nose on the wing's inside surface, and whereby the wing is rendered neutrally or negatively buoyant in air by the at least one enclosure.

10. The apparatus of claim 9, wherein the wing consists of at least two conjoined vaults or lobes of material with a projecting angle, or groin, between the conjoined vaults or lobes characteristically running partly or completely along or parallel to the wing centerline.

11. A three-dimensional, aerodynamic wing capable of flying with variable wind direction and angle of attack, without surface discontinuity, without stabilizing lines, without bridles, and without rigid structure, comprising:

a centerline;
wingtips;
a tail corner; and
plurality of gores of predetermined geometries, defining a large diameter self-supporting rolled-over leading edge of an airfoil, a trailing edge, a nose, an inside windward surface, and an outside leeward surface, whereby all stresses within the wing resulting from aerodynamic forces, gravity, and transient forces due to inertia are converted into tensile stress within the wing, and whereby the wing profile of the wing approaching the trailing edge exhibits increasing convexity.

12. A three-dimensional, aerodynamic wing capable of flying with variable wind direction and angle of attack, without surface discontinuity, without stabilizing lines, without bridles, and without rigid structure, comprising: a centerline;

wingtips;
a tail corner; and
a molded single continuous sheet of material, defining a large diameter self-supporting rolled-over leading edge of an airfoil, a trailing edge, a nose, an inside windward surface, and an outside leeward surface, whereby all stresses within the wing resulting from aerodynamic forces, gravity, and transient forces due to inertia are converted into tensile stress within the wing, and whereby the wing profile of the wing approaching the trailing edge exhibits increasing convexity.

13. An aerodynamic, three dimensional kite capable of flying with variable wind direction and angle of attack, without surface discontinuity, without stabilizing lines, without bridles, and without rigid structure, to replace downwind and cross wind sails on a sailing craft having at least one mast, comprising:

a centerline;
a plurality of tips;
a tail corner;
a plurality of gores of predetermined geometries, defining a large diameter self-supporting rolled-over leading edge of an airfoil, a trailing edge, a nose, an inside windward surface, and an outside leeward surface, whereby all stresses within the kite resulting from aerodynamic forces, gravity, and transient forces due to inertia are converted into tensile stress within the kite, and whereby the profile of the kite approaching the trailing edge exhibits increasing convexity; and attachment means linking kite tips to points on the sailing craft other than a mast whereby kite function and sailing craft motion are controlled.

14. The kite apparatus of claim 13, wherein attachment means comprises three flexible flying lines of predetermined adjustable length, each flying line comprising two ends, wherein for each flying line one end is affixed to a unique kite tip and the other end is affixed to a unique point on the sailing craft.

15. The kite apparatus of claim 14, wherein the flying lines further define three axes in relation to the kite and sailing craft, and wherein roll and pitch, attitude, altitude, flying speed, angle of attack, internal pressure, and gross shape of the kite, and airflow within, are controlled by independent manipulation of flying line length.

16. The kite apparatus of claim 14, wherein the plurality of gores are secured and connected to form the three dimensional kite by first adhesively securing jointures between edge-to-edge gores using double-sided adhesive means, then sewn using flat overlapping seams and a zigzag sewing stitch.

17. The kite apparatus of claim 14, wherein the kite further consists of at least one variously shaped and sized enclosure containing a lighter than air gaseous mixture.

18. The kite apparatus of claim 17, wherein each enclosure is torpedo shaped consisting of a lightweight, gas impermeable material attached to the kite's centerline or near its nose on the kite's inside surface, and whereby the kite is rendered neutrally or negatively buoyant in air by the at least one enclosure.

19. The kite apparatus of claim 18, wherein the kite further comprises of at least two conjoined vaults or lobes of material with a projecting angle, or groin, between the conjoined vaults or lobes characteristically running partly or completely along or parallel to the wing centerline.

20. An aerodynamic, three dimensional kite capable of flying with variable wind direction and angle of attack, without surface discontinuity, without stabilizing lines, without bridles, and without rigid structure to replace downwind and cross wind sails on a sailing craft, comprising:
- a centerline;
- a plurality of tips;
- a tail corner;
- a molded single continuous sheet of material, defining a large diameter self-supporting rolled-over leading edge of an airfoil, a trailing edge, a nose, an inside windward surface, and an outside leeward surface, whereby all stresses within the kite resulting from aerodynamic forces, gravity, and transient forces due to inertia are converted into tensile stress within the kite, and whereby the kite profile approaching the trailing edge exhibits increasing convexity; and
- attachment means linking kite tips to points on the sailing craft other than a mast whereby kite function and sailing craft motion are controlled.

21. The kite apparatus of claim 20, wherein attachment means comprises three flexible flying lines of predetermined adjustable length, each flying line comprising two ends, wherein for each flying line one end is affixed to a unique kite tip and the other end is affixed to a unique point on the sailing craft.

22. The kite apparatus of claim 21, wherein the flying lines further define three axes in relation to the kite and sailing craft, and wherein roll and pitch, attitude, altitude, flying speed, angle of attack, internal pressure, and gross shape of the kite, and airflow within, are controlled by independent manipulation of flying line length.

23. The kite apparatus of claim 21, wherein the kite further consists of at least one variously shaped and sized enclosure containing a lighter than air gaseous mixture.

24. The kite apparatus of claim 23, wherein each enclosure is torpedo shaped consisting of a lightweight, gas impermeable material attached to the kite's centerline or near its nose on the kite's inside surface, and whereby the kite is rendered neutrally or negatively buoyant in air by the at least one enclosure.

25. The kite apparatus of claim 24, wherein the kite further comprises of at least two conjoined vaults or lobes of material with a projecting angle, or groin, between the conjoined vaults or lobes characteristically running partly or completely along or parallel to the wing centerline.

* * * * *